(12) United States Patent
Nishida et al.

(10) Patent No.: US 10,840,760 B2
(45) Date of Patent: Nov. 17, 2020

(54) STATOR OF ROTARY ELECTRIC MACHINE

(71) Applicant: HONDA MOTOR CO., LTD., Tokyo (JP)

(72) Inventors: Makoto Nishida, Saitama (JP); Tomotaka Iki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 38 days.

(21) Appl. No.: 16/227,034

(22) Filed: Dec. 20, 2018

(65) Prior Publication Data

US 2019/0199154 A1 Jun. 27, 2019

(30) Foreign Application Priority Data

Dec. 26, 2017 (JP) ................................. 2017-249952

(51) Int. Cl.
*H02K 3/16* (2006.01)
*H02K 1/16* (2006.01)

(52) U.S. Cl.
CPC ................. *H02K 3/16* (2013.01); *H02K 1/16* (2013.01)

(58) Field of Classification Search
CPC .. H02K 3/00; H02K 3/04; H02K 3/12; H02K 3/16; H02K 3/28; H02K 3/48
See application file for complete search history.

(56) References Cited

U.S. PATENT DOCUMENTS 6,762,528 B2 * 7/2004 Wada ........................ H02K 3/12
310/180
6,903,478 B2 * 6/2005 Dobashi ................... H02K 3/12
310/179

FOREIGN PATENT DOCUMENTS

| CN | 1520008 A | 8/2004 |
| JP | 2005-151668 A | 6/2005 |
| JP | 2006-211779 A | 8/2006 |
| JP | 2015-104249 A | 6/2015 |

OTHER PUBLICATIONS

Sep. 3, 2019, Japanese Office Action issued for related JP Application No. 2017-249952.
Jul. 3, 2020, Chinese Office Action issued for related CN application No. 201811596378.7.

* cited by examiner

*Primary Examiner* — Tran N Nguyen
(74) *Attorney, Agent, or Firm* — Paratus Law Group, PLLC

(57) ABSTRACT

A stator of a rotary electric machine related to the invention includes: a stator core in which a plurality of slots are formed and an opening part of each of the plurality of slots is provided in an inner circumferential surface thereof; and a coil including a plurality of coil segments that are inserted from the opening part of each of the plurality of slots. At least a first coil segment and a second coil segment are arranged so as to be overlapped in a radial direction in each slot, and an engagement part which prevents a relative movement in an axial direction is provided on overlapping surfaces of the first coil segment and the second coil segment.

5 Claims, 8 Drawing Sheets

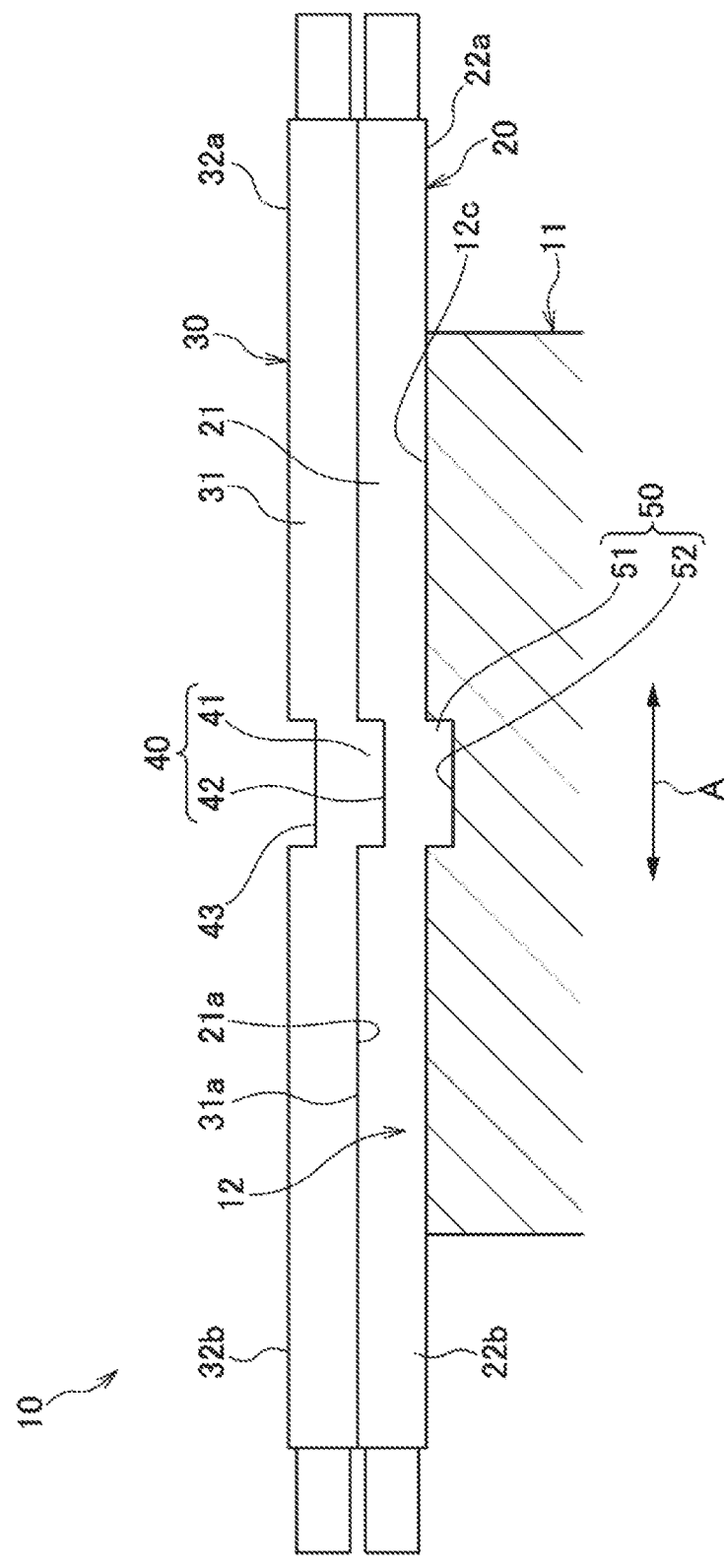

STATOR OF ROTARY ELECTRIC MACHINE

CROSS-REFERENCE TO RELATED APPLICATION

This application is based on and claims priority under 35 USC 119 from Japanese Patent Application No. 2017-249952 filed on Dec. 26, 2017, the contents of which are incorporated herein by reference.

TECHNICAL FIELD

The present invention relates to a stator of a rotary electric machine which is mountable on an electric vehicle, a hybrid vehicle, or the like.

BACKGROUND ART

A stator of a rotary electric machine includes a stator core and a coil to be attached to the stator core. Recently, a so-called segmented conductor type rotary electric machine is known in which a coil loop is formed as the coil by joining a plurality of coil segments (see Japanese Patent Application Laid-Open Publication No. 2006-211779).

However, in the stator of the rotary electric machine described in Japanese Patent Application Laid-Open Publication No. 2006-211779, a movement of the coil segment in the circumferential direction of the stator core is prevented by an inner wall surface of the slot, but a movement in the axial direction is not prevented.

Thus, there is a concern that performance of the stator deteriorates due to the displacement of the coil segment.

The invention provides a stator of a rotary electric machine which enables to prevent performance deterioration of the stator resulting from the displacement of the coil segment.

SUMMARY OF INVENTION

A stator of a rotary electric machine related to the invention includes: a stator core in which a plurality of slots are formed and an opening part of each of the plurality of slots is provided in an inner circumferential surface thereof; and a coil including a plurality of coil segments that are inserted from the opening part of each of the plurality of slots. At least a first coil segment and a second coil segment are arranged so as to be overlapped in a radial direction in each slot, and an engagement part which prevents a relative movement in an axial direction is provided on overlapping surfaces of the first coil segment and the second coil segment.

According to the invention, the first coil segment and the second coil segment arranged in each slot are prevented from moving in the circumferential direction by the inner wall surface of the slot and from moving in the axial direction by the engagement part on the overlapping surfaces. Thus, it is possible to prevent the performance deterioration of the stator resulting, which results from the displacement of the coil segment.

BRIEF DESCRIPTION OF DRAWINGS

Exemplary embodiments of the present invention will be described in detail based on the following figures, wherein:

FIG. 6B is a sectional view illustrating the main portion of the first coil segment and the second coil segment arranged in one slot.

DESCRIPTION OF EMBODIMENTS

Hereinafter, a stator of a rotary electric machine of embodiments of the invention will be described with reference to the drawings.

First Embodiment

Figure 1:
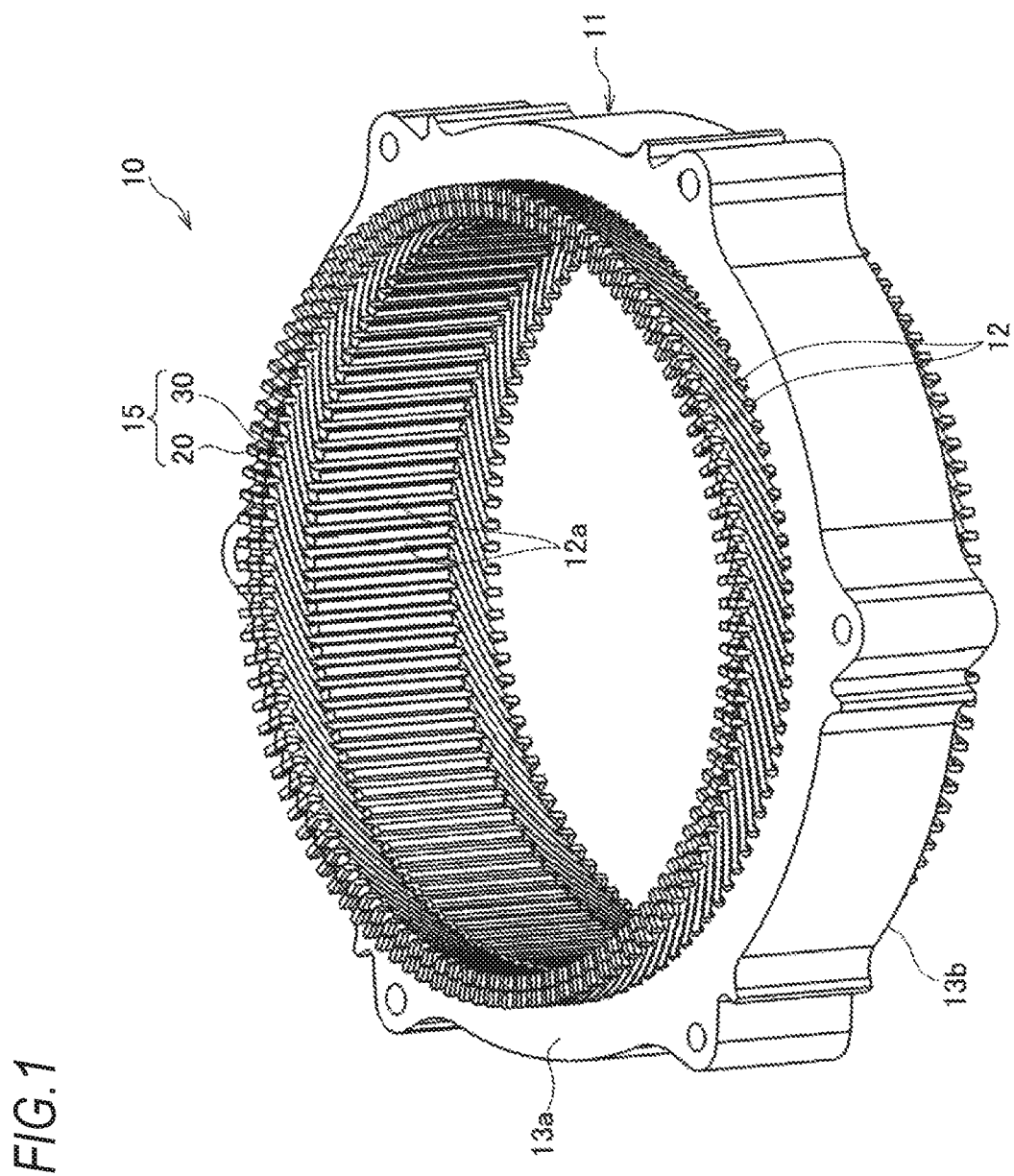
FIG. 1 is a perspective view of a stator of a rotary electric machine according to a first embodiment.

As illustrated in FIG. 1, a stator 10 of a rotary electric machine according to a first embodiment includes a stator core 11 and a coil 15 attached to the stator core.

The stator core 11 is an annular member which is formed by stacking a plurality of annular electromagnetic steel sheets, for example. The stator core 11 is provided with a plurality of slots 12 which are arranged at regular intervals along the circumferential direction of the stator core 11.

Figure 5:
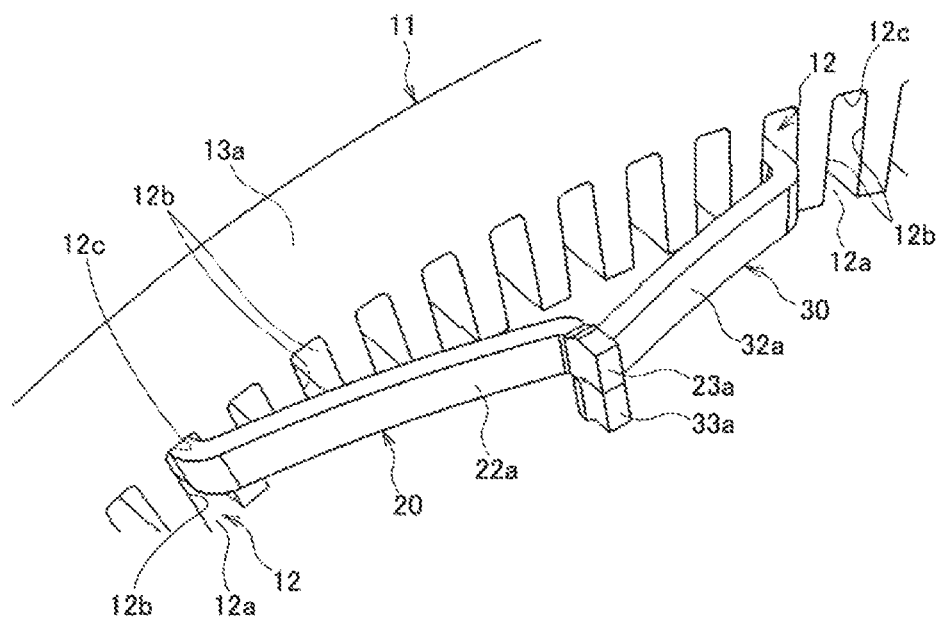
FIG. 5 is a perspective view illustrating a vicinity of a joining portion of the first coil segment and the second coil segment illustrated in FIG. 4 when viewed from one end surface side of the stator core.

The slot 12 is a groove which extends from one end surface 13a on in an axial direction of the stator core 11 to the other end surface 13b in the axial direction of the stator core 11 and includes an opening part 12a in the inner circumferential surface of the stator core 11. As illustrated in FIG. 5, in the slot 12, inner wall surfaces 12b facing each other in the circumferential direction extend from a bottom surface 12c on the radial outside to the opening part 12a to have a substantially linear shape in the radial direction. Therefore, a plurality of opening parts 12a are provided at regular intervals along the circumferential direction in the inner circumferential surface of the stator core 11.

The coil 15 includes a plurality of coil segments. The coil segment is inserted from the opening part 12a of the slot 12 formed in the stator core 11 to project from both end surfaces 13a and 13b of the stator core 11 to the outside in the axial direction.

The plurality of coil segments includes a plurality of first coil segments 20 and a plurality of second coil segments 30. The first coil segment 20 is inserted to the outer diameter side of each slot 12 of the stator core 11. The second coil segment 30 is inserted to the inner diameter side of each slot 12 of the stator core 11.

Figure 2:
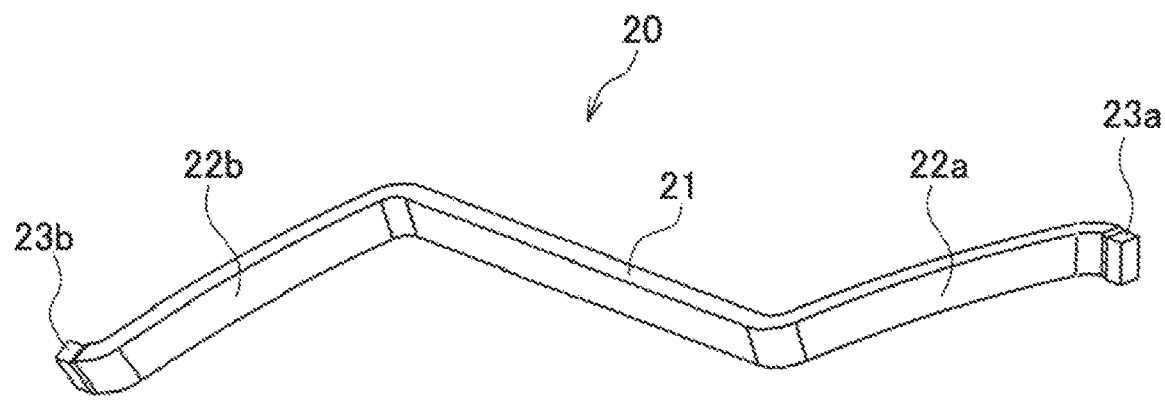
FIG. 2 is a perspective view of a first coil segment in the stator illustrated in FIG. 1.
Figure 3:
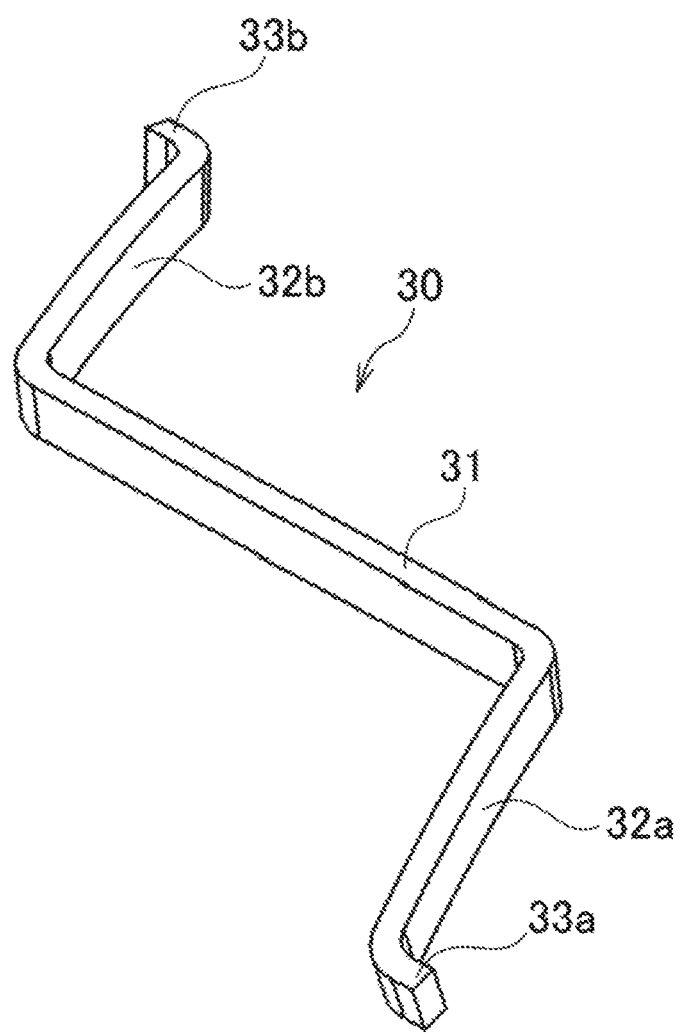
FIG. 3 is a perspective view of a second coil segment in the stator illustrated in FIG. 1.

As illustrated in FIGS. 2 and 3, for example, the first coil segment 20 and the second coil segment 30 are substantially crank-shaped members having a substantially rectangular cross section formed by performing wire processing on a copper wire. The first coil segment 20 is a so-called magnet wire and includes a conductor and an insulating film covering the conductor.

The first coil segment 20 includes a linear insertion part 21 inserted into the slot 12, a first projection part 22a which projects from one end of the insertion part 21 to the outside in the axial direction of the stator core 11 further than the end surface 13a of the stator core 11, and a second projection part 22h which projects from the other end of the insertion part 21 to the outside in the axial direction further than the end surface 13h of the stator core 11.

Figure 4:
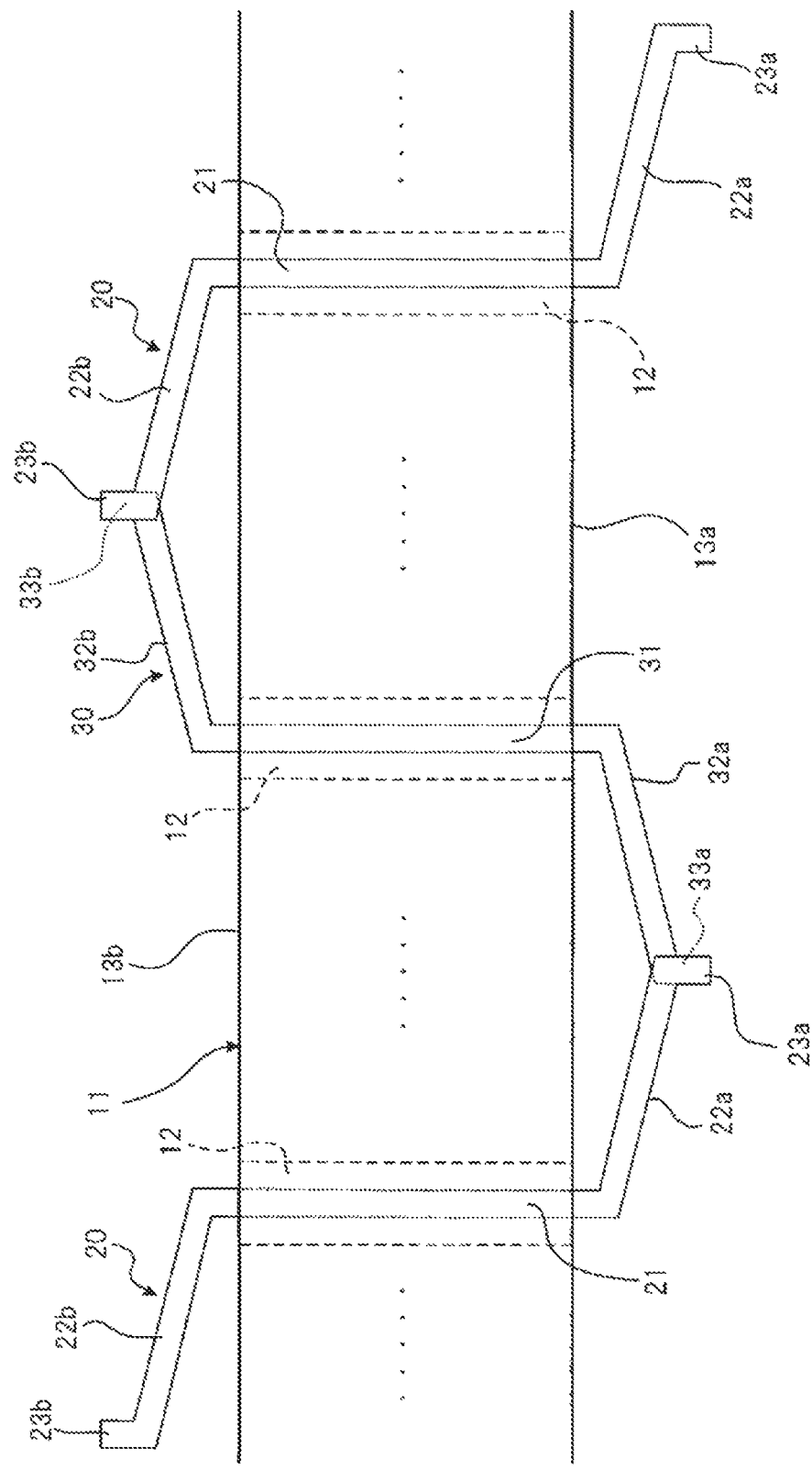
FIG. 4 is a development view partially illustrating the stator when viewed from the outside in a radial direction of the stator core.

The first projection part 22a extends along the circumferential direction of the stator core 11 toward the right direction in FIG. 4. The second projection part 22h extends along the circumferential direction of the stator core 11 toward the direction (the left direction in FIG. 4) opposite to the first projection part 22a.

The second coil segment 30 includes an insertion part 31 inserted into the slot 12, a third projection part 32a which projects to the outside in the axial direction of the stator core 11 further than the end surface 13a of the stator core 11, and a fourth projection part 32h which projects to the outside in the axial direction further than the end surface 13b of the stator core 11.

The third projection part 32a extends along the circumferential direction of the stator core 11 toward the left direction in FIG. 4. The fourth projection part 32b extends along the circumferential direction of the stator core 11 toward the direction (the right direction in FIG. 4) opposite to the third projection part 32a.

As illustrated in FIGS. 4 and 5, an end part 23a of the first coil segment 20 is joined with an end part 33a of the second coil segment 30 which is inserted into another slot 12 at a position separated from the slot 12 (hereinafter, referred to as an insertion slot) inserted with the first coil segment 20 in one direction of the circumferential direction of the stator core 11 (specifically, the position shifted by nine slots from the insertion slot in a clockwise direction when viewed from the end surface 13a side). The joining is that an insulating film covering the conductor is melted and the conductors are electrically connected to each other and is performed by laser welding, for example. Incidentally, in FIG. 4, only a pair of the first coil segment 20 and the second coil segment 30 connected electrically are extracted and illustrated for facilitating understanding.

An end part 23b of the first coil segment 20 is joined with an end part 33b of the second coil segment 30 inserted into still another slot 12 at a position separated from the insertion slot in the other direction of the circumferential direction of the stator core 11 (specifically, the position shifted by nine slots from the insertion slot in a counterclockwise direction when viewed from the end surface 13a side).

In this way, a coil loop is formed by repeating the joining between the end part 23a of the first coil segment 20 and the end part 33a of the second coil segment 30 and the joining between the end part 23b of the first coil segment 20 and the end part 33b of the second coil segment 30.

The coil 15 includes a plurality of coil loops, and the plurality of coil loops are selectively connected so that a power line of plural phases (such as a U phase, a V phase, and a W phase) is formed.

Figure 6A:
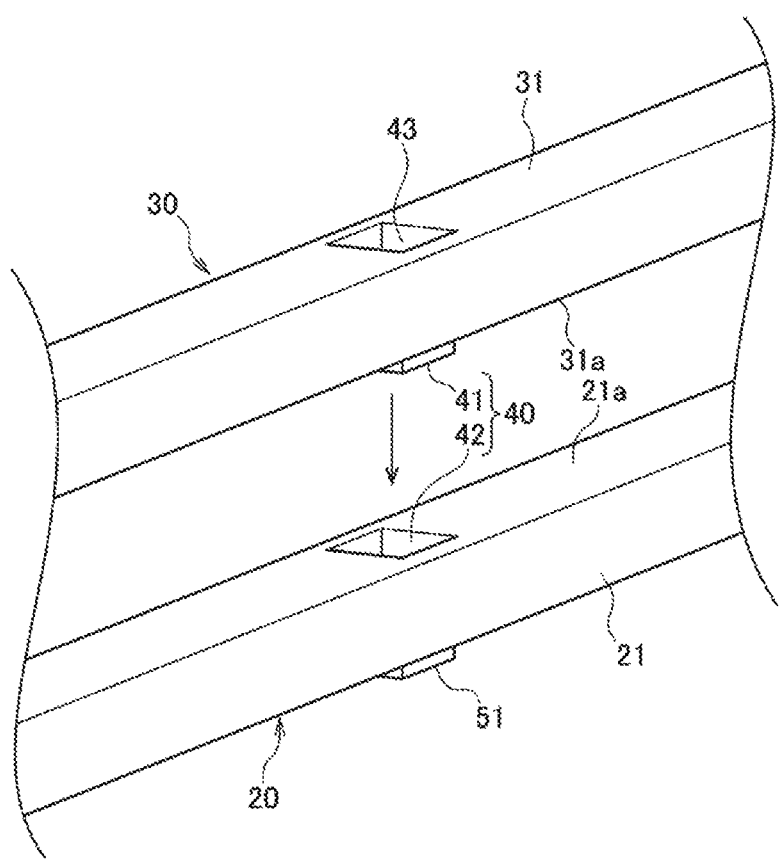
FIG. 6A is an exploded perspective view illustrating a main portion of the first coil segment and the second coil segment arranged in one slot.

As illustrated in FIGS. 6A and 6B, in the first coil segment 20 and the second coil segment 30, an engagement part 40 is provided on the mutually overlapping surfaces 21a and 31a, and the relative movement in the axial direction (the direction of an arrow A in FIG. 6B, hereinafter, simply referred to as the axial direction) of the stator core 11 is prevented.

The engagement part 40 includes a convex part 41 provided in the insertion part 31 of the second coil segment 30 and a concave part 42 provided in the insertion part 21 of the first coil segment 20. The convex part 41 and the concave part 42 are provided in the axial center portions of the insertion parts 31 and 21, respectively. In addition, the convex part 41 and the concave part 42 are both formed in a rectangular shape. In this way, by forming the engagement part 40 to include the convex part 41 and the concave part 42, it is possible to form the engagement part 40 with a simple configuration. The axial positions of the convex part 41 and the concave part 42 are not limited to the center portions, and may be shifted from the center portions to the end surface 13a side or the end surface 13b side. In addition, the shapes of the convex part 41 and the concave part 42 are not limited to the rectangular shape, and can be arbitrarily set to a circular shape, an elliptic shape, a star shape, or the like.

Since the first coil segment 20 and the second coil segment 30 are prevented from moving in the circumferential direction of the stator core 11 by the facing inner wall surfaces 12b of the slot 12, it is possible to prevent the performance deterioration of the stator 10 resulting from the relative displacement between both coil segments 20 and 30 by preventing the coil segments from moving in the axial direction of the stator core 11 by the engagement part 40.

As illustrated in FIG. 6B, the first coil segment 20 and the stator core 11 are provided with an engagement part 50 which prevents the relative movement in the axial direction (the direction of the arrow A in FIG. 6B) of the stator core 11. The engagement part 50 includes a convex part 51 provided in the insertion part 21 of the first coil segment 20 and a concave part 52 provided on the bottom surface 12c of the slot 12 of the stator core 11. The convex part 51 is provided in the axial center portion of the insertion part 21, and the concave part 52 is provided in the axial center portion of the stator core 11. In this way, by forming the engagement part 50 to include the convex part 51 and the concave part 52, it is possible to form the engagement part 50 with a simple configuration. Similarly to the convex part 41 and the concave part 42, the axial positions and the shapes of the convex part 51 and the concave part 52 can be set arbitrarily. In this way, the relative movement of the stator core 11 and the first coil segment 20 in the axial direction is prevented by the engagement part 50, thereby reliably preventing the performance deterioration of the stator 10 resulting from the displacement of the coil 15.

In this embodiment, the insertion part 31 of the second coil segment 30 is also provided with a concave part 43 similar to the concave part 42 of the first coil segment 20. That is, both coil segments 20 and 30 are subjected to the same processing. Therefore, the first coil segment 20 and the second coil segment 30 can be used without distinguishing, and the manufacturing cost of the coil 15 can be reduced.

Second Embodiment

Next, a stator 10 of a rotary electric machine according to a second embodiment of the invention will be described with reference to FIG. 7.

In the stator 10 of the rotary electric machine of the second embodiment, the structure of the first coil segment 20 and the second coil segment 3C) is different from that of the first embodiment. In addition, the concave part 52 is not provided in the stator core 11. Other configurations are the same as those of the first embodiment.

Figure 7:
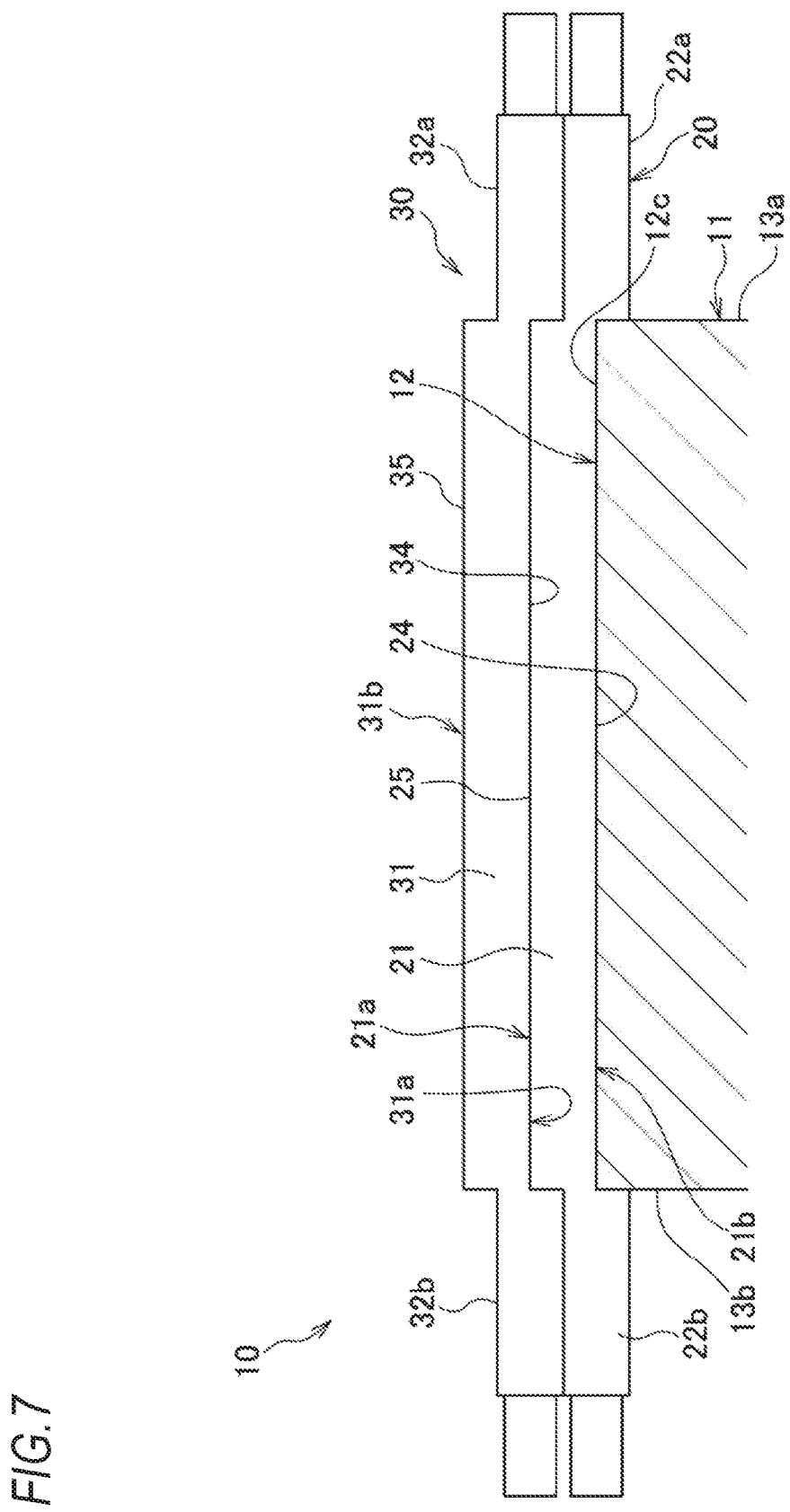
FIG. 7 is a sectional view illustrating a main portion of a first coil segment and a second coil segment arranged in one slot in a stator of a rotary electric machine according to a second embodiment.

As illustrated in FIG. 7, the first coil segment 20 includes a first concave part 24 provided on a facing surface 21b facing the bottom surface 12c of the slot 12 and a first convex part 25 provided on the overlapping surface 21a overlapped with the second coil segment 30. The lengths of the first concave part 24 and the first convex part 25 are substantially equal to the axial length of the slot 12 (stator core 11). The first concave part 24 is engaged with the slot 12. In other words, the first concave part 24 is engaged with both end surfaces 13a and 13b of the stator core 11.

The second coil segment 30 includes a second concave part 34 provided on the overlapping surface 31a overlapped with the first coil segment 20 and a second convex part 35 provided on a surface 31b opposite to the overlapping surface 31a overlapped with the first coil segment 20. The lengths of the second concave part 34 and the second convex part 35 are substantially equal to the axial length of the slot 12 (stator core 11). The second concave part 34 is engaged with the first convex part 25 of the first coil segment 20.

The first convex part 25 of the first coil segment 20 and the second concave part 34 of the second coil segment 30 are engaged with each other, thereby preventing the performance deterioration of the stator 10 resulting from the relative displacement of both the coil segments 20 and 30. In addition, the first concave part 24 of the first coil segment 20 is engaged with both end surfaces 13a and 13b of the stator core 11, thereby preventing the relative movement of the stator core 11 and the first coil segment 20 in the axial direction. Accordingly, it is possible to reliably prevent the performance deterioration of the stator 10 resulting from the displacement of the coil 15.

According to this embodiment, it is not necessary to provide the concave part 52 in the stator 10. Further, also in this embodiment, the first coil segment 20 and the second coil segment 30 are subjected to the same processing. Thus, the first coil segment 20 and the second coil segment 30 can be used without distinguishing. Accordingly, the manufacturing cost of the coil 15 can be reduced.

The above-described embodiments may be modified or improved appropriately.

For example, in the first embodiment, the concave part 43 is provided also in the second coil segment 30. However, the concave part 43 of the second coil segment 30 may be omitted.

In the engagement part 40, the convex part 41 may be provided in the insertion part 21 of the first coil segment 20, and the concave part 42 may be provided in the insertion part 31 of the second coil segment 30. Similarly, in the engagement part 50, the convex part 51 may be provided on the bottom surface 12c of the slot 12 of the stator core 11, and the concave part 52 may be provided on the insertion part 21 of the first coil segment 20.

A configuration may be adopted which is made by combining the configuration of the first embodiment and the configuration of the second embodiment. For example, as illustrated in FIG. 7, in order to prevent the relative movement of the stator 10 and the first coil segment 20 in the axial direction, the configuration may be adopted in which the first concave part 24 of the first coil segment 20 is engaged with the slot 12. As illustrated in FIG. 6B, in order to prevent the relative movement of the first coil segment 20 and the second coil segment 30 in the axial direction, the configuration may be adopted in which the concave part 42 of the first coil segment 20 is engaged with the convex part 41 of the second coil segment 30.

In the above-described embodiments, the stator of the rotary electric machine is exemplified in which two coil segments 20 and 30 are arranged in the slot 12. However, the stator of the rotary electric machine may be formed in which three or more coil segments are arranged in the slot.

At least the following items are described in this specification. Incidentally, the corresponding components or the like in the embodiment are indicated in the parentheses, but the invention is not limited thereto.

(1) A stator (stator 10 of a rotary electric machine) of a rotary electric machine including:

a stator core (stator core 11) in which a plurality of slots (slots 12) are formed and an opening part (opening parts 12a) of each of the plurality of slots is provided in an inner circumferential surface thereof; and a coil (coil 15) including a plurality of coil segments that are inserted from the opening part of each of the plurality of slots. And at least a first coil segment (first coil segment 20) and a second coil segment (second coil segment 30) are arranged so as to be overlapped in a radial direction in each slot, and an engagement part (engagement part 40) which prevents a relative movement in an axial direction is provided on overlapping surfaces (overlapping surfaces 21a and 31a) of the first coil segment and the second coil segment.

According to (1), in the first coil segment and the second coil segment arranged in each slot, a circumferential movement is prevented by the inner wall surface of the slot, and an axial movement is prevented by the engagement part on the overlapping surfaces. Thus, it is possible to prevent the performance deterioration of the stator resulting from the displacement of the coil segment.

(2) The stator of the rotary electric machine according to (1) may be characterized in that the engagement part includes a convex part (convex part 41) provided in one of the first coil segment and the second coil segment and a concave part (concave part 42) provided in the other of the first coil segment and the second coil segment.

According to (2), the engagement part includes the convex part and the concave part. Thus, the engagement part can be formed with a simple configuration.

(3) The stator of the rotary electric machine according to (1) or (2) may be characterized in that the first coil segment is arranged on an outermost of the slot in the axial direction, and another engagement part (engagement part 50) which prevents a relative movement in the axial direction is provided on facing surfaces of the first coil segment and the slot.

According to (3), the relative movement of the stator core and the first coil segment in the axial direction is prevented by the other engagement part. Thus, it is possible to prevent the performance deterioration of the stator resulting from the displacement of the coil with respect to the stator core.

(4) The stator of the rotary electric machine according to (1) or (2) may be characterized in that the first coil segment is arranged on an outermost of the slot in the axial direction, and the first coil segment includes a concave part (first concave part 24) having a length substantially equal to an axial length of the slot on a facing surface (facing surface 21b) facing a bottom surface (bottom surface 12c) of the slot.

According to (4), the first coil segment, which is arranged on the outermost of the slot in the radial direction, includes the concave part having the length substantially equal to the axial length of the slot on the facing surface facing the bottom surface of the slot. Thus, the concave part of the first coil segment is engaged with the slot, thereby also preventing the relative movement of the stator core and the coil segment in the axial direction. Accordingly, it is possible to reliably prevent the performance deterioration of the stator resulting from the displacement of the coil.

(5) The stator of the rotary electric machine according to (1) may be characterized in that the first coil segment is arranged on an outermost of the slot in the radial direction, the first coil segment includes a first concave part (first concave part 24) which is provided on a facing surface facing a bottom surface (bottom surface 12*c*) of the slot and has a length substantially equal to an axial length of the slot and a first convex part (first convex part 25) which is provided on an overlapping surface (overlapping surface 21*a*) overlapped with the second coil segment and has a length substantially equal to the axial length of the slot, and the second coil segment includes a second concave part (second concave part 34) which is provided on an overlapping surface (overlapping surface 31*a*) overlapped with the first coil segment, is engaged with the first convex part of the first coil segment, and has a length substantially equal to the axial length of the slot.

According to (5), it is possible to prevent the relative movement of the stator core and the first coil segment and the relative movement of the first coil segment and the second coil segment.

What is claimed is:

1. A stator of a rotary electric machine, comprising:
a stator core in which a plurality of slots are formed and an opening part of each of the plurality of slots is provided in an inner circumferential surface thereof; and
a coil including a plurality of coil segments that are inserted from the opening part of each of the plurality of slots, wherein
at least a first coil segment and a second coil segment are arranged so as to be overlapped in a radial direction in each slot,
an engagement part which prevents a relative movement in an axial direction is provided on overlapping surfaces of the first coil segment and the second coil segment,
the first coil segment is arranged on an outermost of the slot in the radial direction, and
the first coil segment is engaged with a bottom surface of the slot.

2. The stator of the rotary electric machine according to claim 1, wherein
the engagement part includes a convex part provided in one of the first coil segment and the second coil segment and a concave part provided in the other of the first coil segment and the second coil segment.

3. The stator of the rotary electric machine according to claim 1, wherein
another engagement part which prevents the relative movement in the axial direction is provided on facing surfaces of the first coil segment and the slot.

4. The stator of the rotary electric machine according to claim 1, wherein
the first coil segment includes a concave part having a length substantially equal to an axial length of the slot on a facing surface facing a bottom surface of the slot.

5. The stator of the rotary electric machine according to claim 1, wherein
the first coil segment includes:
a first concave part which is provided on a facing surface facing a bottom surface of the slot and has a length substantially equal to an axial length of the slot, and
a first convex part which is provided on an overlapping surface overlapped with the second coil segment and has a length substantially equal to the axial length of the slot, and
the second coil segment includes:
a second concave part which is provided on an overlapping surface overlapped with the first coil segment, is engaged with the first convex part of the first coil segment, and has a length substantially equal to the axial length of the slot.

* * * * *